May 30, 1933.  M. A. WECKERLY  1,911,660
DASHPOT FOR WEIGHING SCALES
Filed Sept. 12, 1929  2 Sheets-Sheet 1
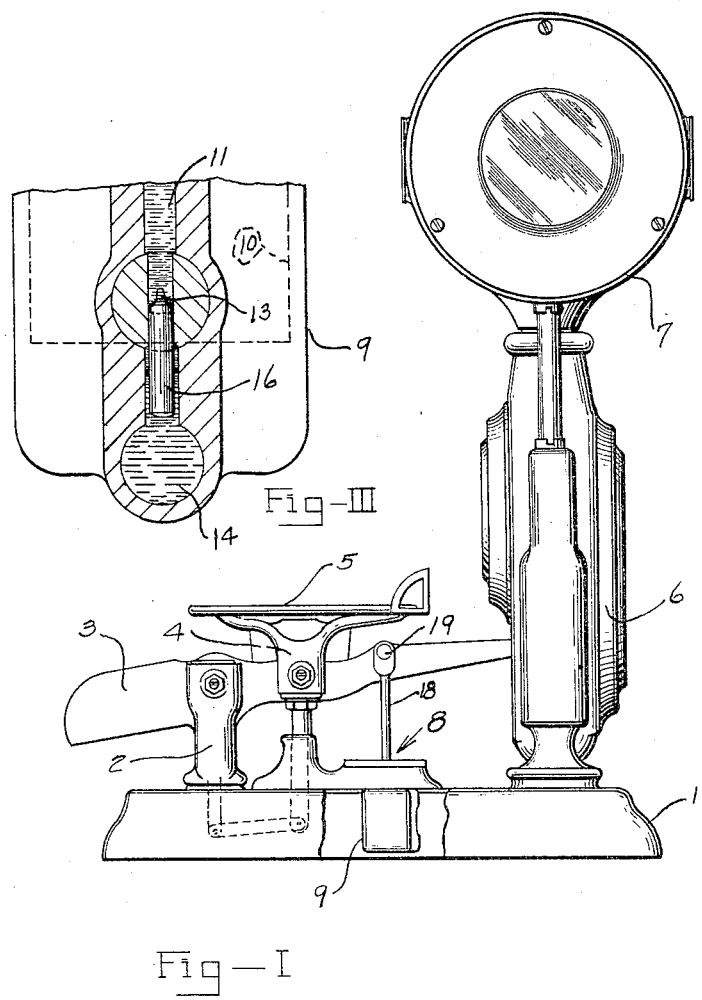
Fig-I
Inventor
MARK A. WECKERLY
By CM Marshall
Attorney May 30, 1933.  M. A. WECKERLY  1,911,660
DASHPOT FOR WEIGHING SCALES
Filed Sept. 12, 1929  2 Sheets-Sheet 2
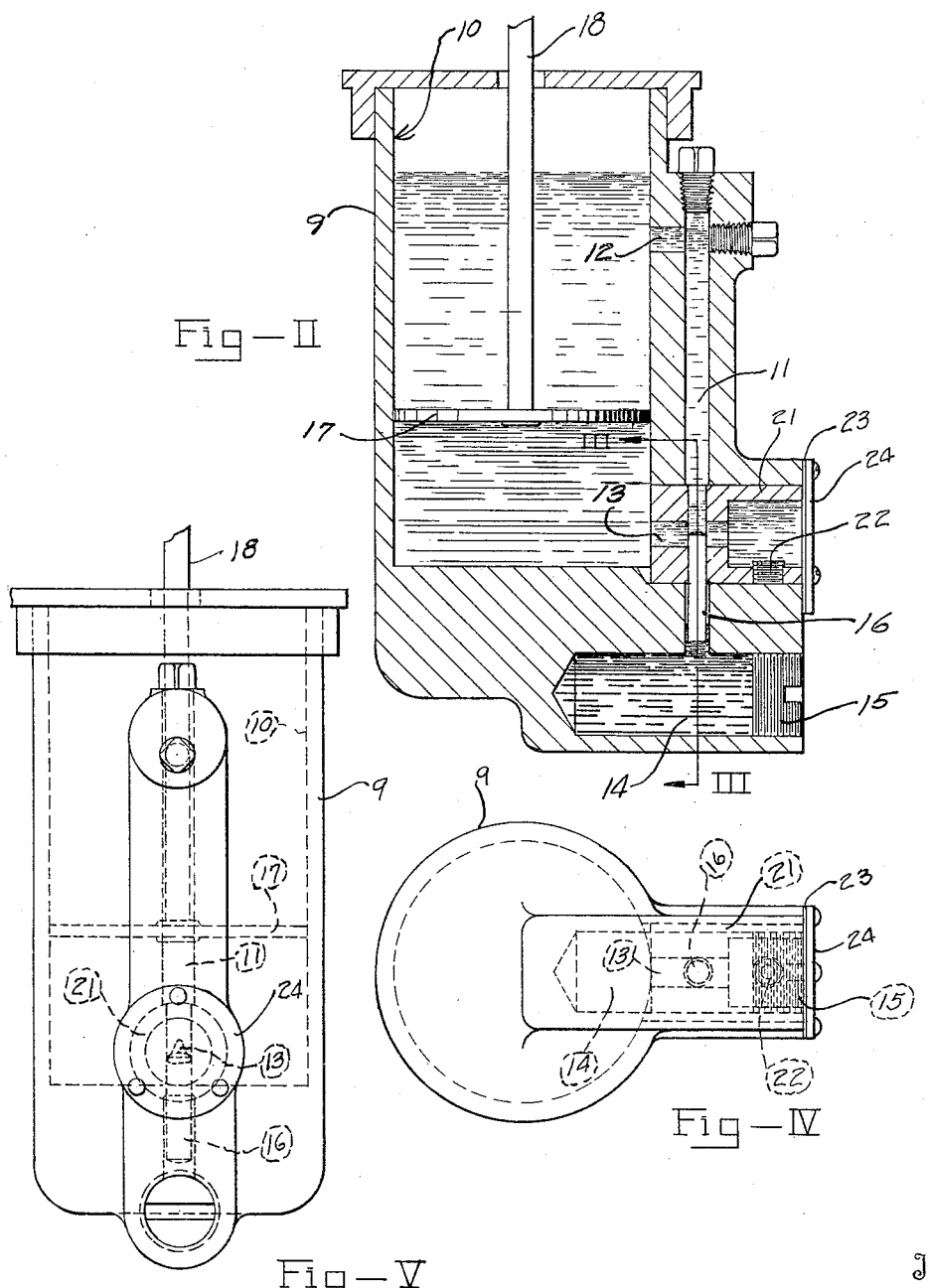
Inventor
MARK A. WECKERLY
By CM Marshall
Attorney Patented May 30, 1933

1,911,660

UNITED STATES PATENT OFFICE

MARK A. WECKERLY, OF TOLEDO, OHIO, ASSIGNOR TO TOLEDO SCALE MANUFACTURING COMPANY, OF TOLEDO, OHIO, A CORPORATION OF NEW JERSEY

DASHPOT FOR WEIGHING SCALES

Application filed September 12, 1929. Serial No. 392,209.

This invention relates to weighing scales and particularly to weighing scales which indicate the weight of commodities on a chart by means of a movable indicator or on a movable indicator by means of a stationary index. Scales of this type must be provided with a dash pot to dampen the vibrations of the movable members, to absorb shock and to effectively stop the indicating member within a short period of time so that the indications may be read. These dash pots generally consist of a tubular receptacle which is stationarily mounted and filled with oil or other fluid and has a piston positioned within the receptacle which is operatively connected to a movable member of the scale for reciprocal motion therein.

One of the principal objects of this invention is the provision of a dash pot having a valve which automatically compensates for the change of viscosity, due to the temperature, of the fluid within the receptacle.

Another object is the provision of a simple and efficient dash pot for accomplishing this and which may be economically manufactured.

Another object is the provision of a dash pot having passages for the fluid and simple temperature controlled means for regulating the flow of the fluid in said passages.

A further object is the provision of a valve orifice adapted to be substantially closed at a rate proportional to the viscosity change of the fluid damping medium.

A still further object is the provision of means whereby orifices may be readily interchanged to conform to the viscosity curve of different fluids and different damping requirements.

Other objects and advantages will be apparent from the following description in which reference is had to the accompanying drawings and wherein similar reference numerals designate similar parts throughout the several views.

In the drawings:—

Figure I is a side elevational view of a weighing scale embodying the dash pot of my invention.

Figure II is an enlarged sectional elevation showing such a dash pot.

Figure III is a fragmentary sectional view, showing the automatic valve mechanism, taken substantially along the line III—III of Figure II.

Figure IV is a bottom view of the dash pot.

Figure V is an end elevational view.

The scale to which I have shown my invention attached is fully disclosed and illustrated in U. S. Patent #1,166,128 to C. H. Hapgood, and I will describe it only in so far as is necessary to completely describe my invention.

A base 1, which is preferably an iron casting, supports adjacent one end a base horn 2 which is provided with suitable agate bearings and supports the fulcrum pivots (not shown) of a lever 3. Mounted on load pivots (not shown) which extend laterally from the sides of the lever is a spider 4 supporting a commodity receiver 5. Secured to the top of the base on the opposite end is a hollow housing 6 in which is suitably supported a load counterbalancing mechanism (not shown). Mounted on the housing 6 is a casing 7 in which the indicating mechanism (not shown) is suitably disposed. The nose of the lever 3, which is fulcrumed on the base horn 2, extends into the interior of the housing 6 and is there operatively connected to the load counterbalancing and indicating mechanisms. Extending through an aperture in the base 1 is a dash pot 8. This dash pot consists of a body 9 preferably made of bakelite or other synthetic resin moulding material, or any material which will not amalgamate with mercury and is provided with a main well 10 which is formed by parallel walls, a by-pass 11, and connecting passages 12 and 13. The by-pass 11 extends downwardly past the connecting passage 13 to a horizontally disposed well 14 which is located beneath the main well 10. It is filled with mercury and closed by a screw plug 15.

The mercury completely fills the well 14 and extends slightly into the by-pass 11. A float 16 which is made of a material which will not readily amalgamate with mercury, is buoyantly supported on that portion of the mercury which extends into the passage 11. The screw plug 15 also serves to adjust the level of the mercury and the initial position of the float. The main well 10 is filled with a fluid preferably oil which offers a resistance to the passage of the piston 17 which, with its rod 18, is pivotally connected at 19 to the lever 3. As has been previously stated, the object of a dash pot in a scale is to dampen the vibrations and to allow the indicating members to come quickly to rest. The fluids used in dash pots are generally of such character that their viscosity changes with the temperature changes. When an ordinary oil dash pot is adjusted, let us assume on a winter afternoon when the scale has assumed the room temperature, when the store is opened the next morning, the temperature generally will be considerably lower, and the viscosity of the oil has consequently increased to such an extent that the passage of the plunger 17 through the oil in the well 10 is exceedingly slow and it will take a comparatively long time for the chart to revolve to the indication of the weight of a load, placed on the platform, and the dash pot must be adjusted. When the store is then heated, the oil becomes less viscous, the vibrations of the indicator increase, and the dash pot must again be adjusted.

It is my intention to employ the expansive and contractive property of mercury to automatically compensate for the change in the viscosity of the fluid. The size of the horizontally disposed well 14, is calculated to receive a predetermined amount of mercury. The expansion of this amount of mercury is such that in comparatively warm temperatures it increases its volume, to such an extent, which forces the floating member 16 upwardly to a height where it nearly closes the opening of the connecting passage 13 into the by-pass 11, thus preventing a too rapid flow of the oil or other fluid. When, however, on the other hand the temperature drops and the mercury contracts, the floating member 16 recedes, opening the passage 13 and permitting the oil, which in consequence to the drop in temperature has increased its viscosity, to flow through the by-pass in a greater volume. The speed with which the plunger travels through the oil, governs the speed with which the indication will come to rest, as the piston rod 18 is connected to the lever which in turn drives the indicating mechanism.

It will be seen that the construction of this dash pot is such that all machine operations can be performed on such simple machines as lathes, drill-presses etc., which are found in every machine shop, and that the machine operations are so simple that any mechanic may perform them economically and efficiently.

The rate at which the viscosity of the oil changes, with the temperature, is not uniform. The resistance to the flow of oil through the passages 12 and 13, however, must be constant in order to obtain a constant damping effect. The opening must be comparatively large for the oil when it has a high viscosity and comparatively small for the oil when it has a low viscosity. To accomplish this it has been found that the orifice of the passage 13 may be shaped so that the change in area is proportional to the change of the viscosity, due to the temperature changes.

It has also been found that it is advantageous to change the shape of the orifice for scales having different capacities or which present different damping requirements. To accomplish this economically, I have provided that the passage 13 is in a removable member 21 which may be readily interchanged. This member 21, after being positioned, is locked in place by a headless set screw 22. The member 21, however, has an additional advantage, in that the noncircular opening, which must be broached, is located in a small part on which the machine operations may be performed economically and efficiently. A gasket 23 and a plate 24 are provided to cover the aperture in which the member 21 is stationed.

The embodiment of my invention herein shown and described is to be regarded as illustrative only, and it is to be understood that the invention is susceptible to variation, modification and change within the spirit and scope of the subjoined claims.

Having described my invention, I claim:

1. A damping device including a dash pot body having a by-pass and means restricting said by-pass including a thermo expansive liquid and a float borne thereby.

2. A damping device including a dash pot body having a by-pass and means restricting said by-pass including a thermo expansive liquid and a float borne thereby, said float operating to exclude damping fluid from said thermally expansive fluid.

MARK A. WECKERLY.